United States Patent
Smith

(10) Patent No.: US 7,588,665 B2
(45) Date of Patent: Sep. 15, 2009

(54) APPARATUS FOR CONVERTING WASTE PRODUCTS INTO USABLE FOSSIL FUEL

(76) Inventor: Steven W. Smith, 7237 Birchwood Dr., Dallas, TX (US) 75240

( * ) Notice: Subject to any disclaimer, the term of this patent is extended or adjusted under 35 U.S.C. 154(b) by 492 days.

(21) Appl. No.: 11/231,125

(22) Filed: Sep. 20, 2005

(65) Prior Publication Data
US 2007/0062104 A1 Mar. 22, 2007

(51) Int. Cl.
*C10B 1/00* (2006.01)
(52) U.S. Cl. ............... 202/84; 202/96; 202/105; 202/133; 202/136
(58) Field of Classification Search ............... 202/84, 202/96, 105, 133, 136
See application file for complete search history.

(56) References Cited

U.S. PATENT DOCUMENTS

| | | | |
|---|---|---|---|
| 531,108 A | 12/1894 | Forbes | |
| 668,210 A | 2/1901 | Powter | |
| 705,034 A | 7/1902 | Cameron | |
| 707,566 A | 8/1902 | Edson | |
| 829,954 A | 9/1906 | Edson | |
| 1,145,845 A | 7/1915 | Pardington et al. | |
| 4,259,444 A | 3/1981 | Chakrabarty | |
| 4,338,399 A | 7/1982 | Weil et al. | |
| 5,057,189 A * | 10/1991 | Apffel | 202/113 |
| 5,269,947 A | 12/1993 | Baskis | |
| 5,360,553 A | 11/1994 | Baskis | |
| 5,543,061 A | 8/1996 | Baskis | |
| 5,628,969 A | 5/1997 | Aulbaugh et al. | |
| 5,720,232 A * | 2/1998 | Meador | 110/346 |
| 5,746,987 A | 5/1998 | Aulbaugh et al. | |
| 5,894,012 A * | 4/1999 | Denison | 422/150 |
| 6,105,275 A | 8/2000 | Aulbaugh et al. | |
| 6,143,136 A | 11/2000 | Aulbaugh et al. | |
| 6,226,889 B1 | 5/2001 | Aulbaugh et al. | |
| 6,835,861 B2 * | 12/2004 | Nichols et al. | 585/241 |

FOREIGN PATENT DOCUMENTS

WO   WO2004/018592   * 3/2004

OTHER PUBLICATIONS

Valenti, M., "Oil Sand Kicks into High Gear", American Society of Mechanical Engineers, *ME Magazine*, Dec. 1998.
Lemley, B., "Anything Into Oil", *Discover Magazine*, May 2003, pp. 51-57.
Lemley, B., "Anything Into Oil", *Discover Magazine*, Jul. 2004, pp. 56-57.

(Continued)

*Primary Examiner*—N. Bhat
(74) *Attorney, Agent, or Firm*—Steven W. Smith

(57) ABSTRACT

An apparatus for converting a process material such as powdered plastic to usable fossil fuel. A hollow cylinder having a piston slidably mounted therein is externally heated to produce an internal temperature of approximately 500.degree. C. The powdered plastic is injected into the heated cylinder utilizing an inert gas, thereby vaporizing the powdered plastic and forming a volatile gas. An electric motor rotates a crankshaft to slide the piston and expel the volatile gas from the cylinder. A condenser receives the volatile gas and condenses the gas into the usable fossil fuel. A first stage condenser condenses oil, and a secondary stage condenses Diesel fuel, kerosene, toluene, gasoline, or natural gas.

18 Claims, 2 Drawing Sheets

OTHER PUBLICATIONS

Roberts, M. et al., "Animal Waste to Marketable Products", Natural Gas Technologies Conference, Phoenix, AZ, Feb. 8-11, 2004.

Ferrada, J.J., "Sustainable By-Product Recovery in the Mining Industry", Oak Ridge National Laboratory, date unknown.

* cited by examiner

APPARATUS FOR CONVERTING WASTE PRODUCTS INTO USABLE FOSSIL FUEL

BACKGROUND

The present invention relates to a chemical reforming process and apparatus. More particularly, and not by way of limitation, the present invention relates to a method and apparatus for converting waste products such as plastic into usable fossil fuel. In essence, the apparatus operates as a Reverse Internal Combustion Engine (RICE) by receiving mechanical energy and waste products as inputs, and outputting usable fossil fuel.

U.S. Pat. No. 5,269,947, U.S. Pat. No. 5,360,553, and U.S. Pat. No. 5,543,061 all relate to a known Thermal Depolymerization Process (TDP) through which longer polymer chains found in organic material are broken into shorter hydrocarbon polymer chains through the application of heat and pressure, and the subsequent release of the heat and pressure. The above patents describe methods of improving the efficiency of the TDP process by feeding back heat released during the latter part of the process and using the released heat to preheat the organic material prior to entering a high temperature and pressure phase. In addition, natural gas, which is given off as a product of the TDP process, is used to fuel the furnaces that heat the material during the process. All of these patents have the shortcoming that the components must be manufactured to withstand both high temperatures (over 500° C.) and high pressures (up to 700 psi relative pressure).

U.S. Pat. No. 6,226,889, U.S. Pat. No. 6,143,136, U.S. Pat. No. 6,105,275, and U.S. Pat. No. 5,746,987 all relate to a method and apparatus for removing at least one volatile contaminant from contaminated material by using a rotary vacuum retort during high temperature and vacuum processing. Such an apparatus could theoretically be used to perform the TDP process, although no known system for that purpose exists. All of these patents have the shortcoming that if they were to be modified to perform the TDP process, they would require complex mechanical structures to heat the rotating retort and maintain the internal vacuum while adding raw material and removing volatile gases and resulting solid materials.

What is needed in the art is a method and apparatus for converting waste products into usable fossil fuel that is simple, efficient, and easily manufactured. The present invention provides such a method and apparatus.

SUMMARY

The present invention provides a Reverse Internal Combustion Engine (RICE) in which process materials such as plastic, tires, or other materials comprising polymer chains are heated to the point that volatile compounds are vaporized. The volatile gases are then extracted and condensed into various usable fuels such as oil, kerosene, toluene, gasoline, and natural gas.

Thus, in one aspect, the present invention is directed to an apparatus for converting process material to usable fossil fuel. The apparatus includes a hollow cylinder having a piston slidably mounted therein; means for externally heating the cylinder; and means for introducing the process material into the heated cylinder, thereby vaporizing the process material and forming a volatile gas. The apparatus also includes means for sliding the piston to expel the volatile gas from the cylinder; and a condenser connected to the cylinder for receiving the volatile gas and condensing the volatile gas into the usable fossil fuel.

In another aspect, the present invention is directed to an apparatus for converting powdered plastic to usable fossil fuel. The apparatus includes a hollow cylinder having a piston slidably mounted therein; a gas burner for externally heating the cylinder; and an injector for injecting the powdered plastic into the heated cylinder utilizing an inert gas, thereby vaporizing the process material and forming a volatile gas. The apparatus also includes an electric motor and crankshaft for sliding the piston to expel the volatile gas from the cylinder, and a condenser connected to the cylinder for receiving the volatile gas and condensing the gas into the usable fossil fuel.

In yet another aspect, the present invention is directed to a method of converting process material to usable fossil fuel. The method includes externally heating a hollow cylinder having a piston slidably mounted therein; introducing the process material into the heated cylinder, thereby vaporizing the process material and forming a volatile gas; and sliding the piston to expel the volatile gas from the cylinder. The method also includes providing the expelled volatile gas to a condenser, and condensing the volatile gas into the usable fossil fuel.

BRIEF DESCRIPTION OF THE SEVERAL VIEWS OF THE DRAWINGS

In the following, the essential features of the invention will be described in detail by showing preferred embodiments, with reference to the figures of the attached drawings.

DETAILED DESCRIPTION

The present invention receives mechanical energy and waste products as inputs, and outputs usable fossil fuel. This is done by operating, in essence, as a Reverse Internal Combustion Engine (RICE). Although there is not actually any "combustion" in the RICE due to the lack of oxygen, process materials such as plastic, tires, or other materials comprising polymer chains are heated to the point that volatile compounds are vaporized. The volatile gases are then extracted and condensed into various usable fuels such as oil, kerosene, toluene, gasoline, and natural gas.

Figure 1:
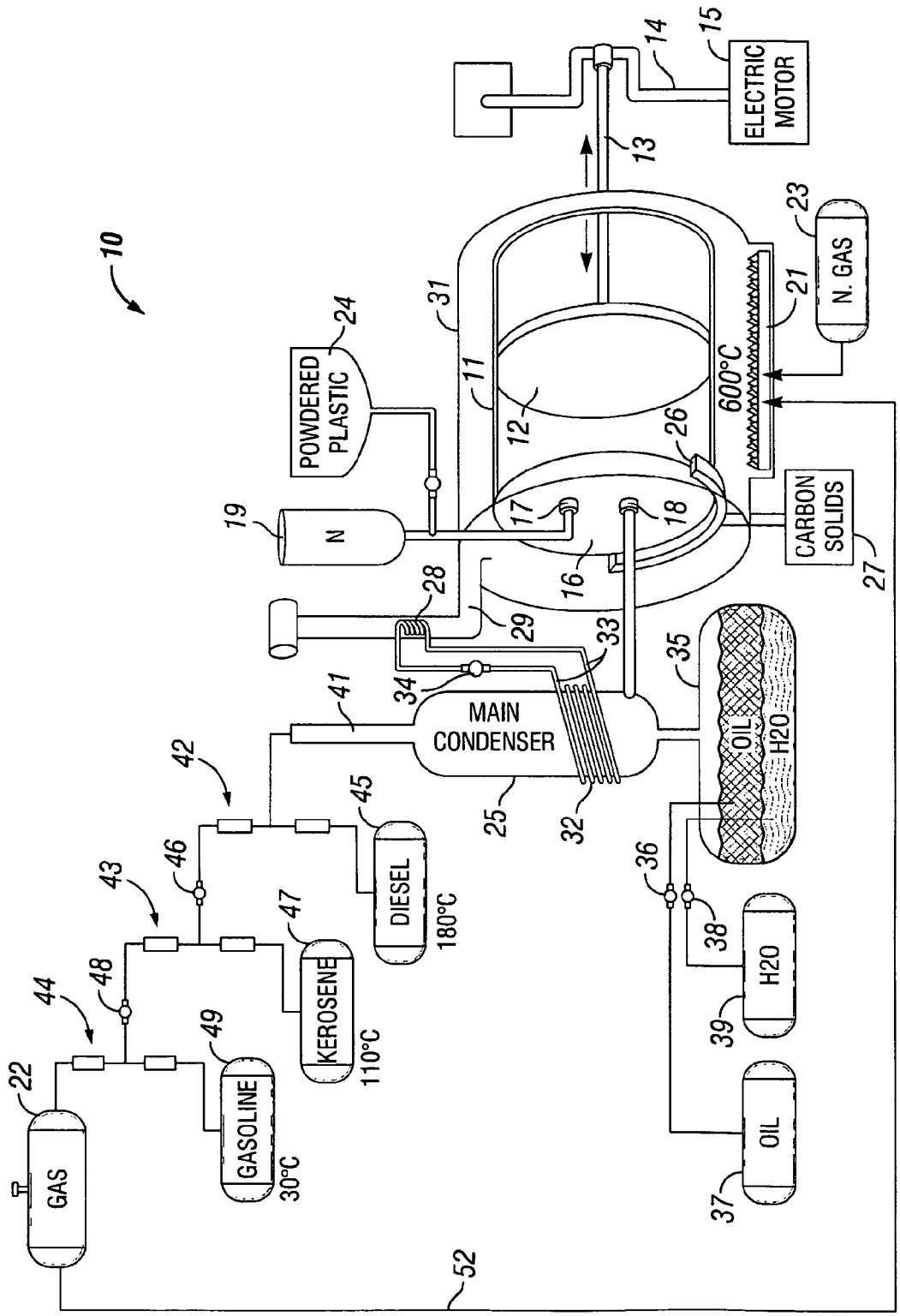
FIG. 1 is a functional block diagram of an exemplary embodiment of the Reverse Internal Combustion Engine (RICE) of the present invention.

FIG. 1 is a functional block diagram of an exemplary embodiment of the RICE 10 of the present invention. A cylinder 11 encloses a piston 12, which slides in the cylinder much like a piston in an internal combustion engine. The piston may be made to move by pushing on a piston rod 13. The rod may be connected to a crankshaft 14, which is turned by, for example, an electric motor 15. Other mechanisms for moving the piston through its stroke may also be used and are within the scope of the invention. For example, the piston or piston rod may be connected to a cam attached to a shaft of an electric motor or internal combustion engine. A gearbox may be utilized to control the rotation of the shaft and cam.

The cylinder is preferably constructed of a material such as cast iron, which is capable of withstanding temperatures of 600-1,000° C. and internal pressures of 500 to 700 psi (relative pressure). The cylinder includes a cylinder head 16 having an intake mechanism 17 and an exhaust mechanism 18 therein. In one embodiment, the intake mechanism is an intake valve that opens when the piston moves away from the cylinder head and closes when the piston moves toward the cylinder head. In another embodiment, the intake mechanism 17 is an injector powered by a container 19 of compressed nitrogen, argon, or other inert, non-flammable gas. Prior to startup, the inert gas may be utilized to purge the entire system so that there is no residual oxygen in the cylinder 11, a main condenser 25, or any of the piping, thus preventing any unwanted combustion of hot volatile gases. The exhaust mechanism may be an exhaust valve that closes when the piston moves away from the cylinder head (i.e., the downstroke) and opens when the piston moves toward the cylinder head (i.e., the upstroke).

The cylinder 11 is preferably heated by an external heat source 21 such as natural gas burners, electric resistance heaters, or high-pressure steam to an internal temperature in the range of 350-1,000° C., preferably approximately 600° C. Natural gas burners may be preferred for economic reasons because one of the end-products of the RICE is natural gas 22, which may then be utilized to supplement an external supply source 23 to reduce the cost of heating the cylinder. The cylinder may also include external heating fins (not shown), which capture heat from the external heat source and assist in heat transfer to the interior chamber of the cylinder.

An input material such as powdered plastic 24, or other material rich in polymer compounds that can be ground into an injectable powder, is input through the intake valve 17 to the cylinder 11. The plastic is preferably ground into a fine powder because the smaller the particle size, the greater the particle surface area, the faster the processing time, and the better the ultimate removal of the volatile compounds. The powdered plastic is injected into the cylinder after the piston 12 has passed top-dead-center and has started the downstroke away from the cylinder head 16, thereby producing a partial vacuum in the cylinder. Alternatively, nitrogen may be bled into the cylinder as the piston starts the downstroke, thereby pre-heating the nitrogen in the cylinder prior to injecting the powdered plastic. As the piston continues its downstroke, the volatile compounds in the powdered plastic are vaporized, but not combusted due to the lack of oxygen.

Plastic powder may be manufactured in one of several ways. Plastic bottles such as soda bottles are typically made of polyethylene-terephthalate (PET). Recycled plastic bottles may be heated to the PET melting point and pressed into a solid block. A rotating metal file or sanding disk may be used to file or sand powder from the block. Alternatively, plastic flakes may be ground into powder. Plastics recyclers typically grind recycled plastic into small flakes. The flakes may then be placed in a device such as a large blender or shredder where high-speed blades shatter the flakes into small powder particles.

Referring still to FIG. 1, the vaporization process within the cylinder 11 causes an increase in gas volume as the solid plastic particles turn to gas and expand. The downstroke of the piston 12 relieves most of the overpressure resulting from this expansion, and maintains a relatively low-pressure environment in the cylinder. Depending on the length of the stroke and the amount of powdered plastic injected into the cylinder, the expansion of the volatile gases may be used to help power the RICE by adding a powered downstroke to the process. Preferably, vaporization should be complete when the piston passes bottom-dead-center and begins the upstroke back toward the cylinder head 16. At this point, the intake injector 17 has been closed, and the exhaust valve 18 opens to allow the hot volatile gases to escape to the main condenser 25. As the piston passes top-dead-center, the exhaust valve closes, and shortly thereafter, powdered plastic 24 is again injected into the cylinder 11. This process continues in a cyclical manner.

It should be understood that under most operational conditions, the RICE does not operate at the speed normally associated with internal combustion engines. Finely powdered plastic should totally vaporize within approximately one second at temperatures over 600° C. Thus, for example, if the powder is injected when the piston has traveled through approximately ⅓ of the downstroke, and the remaining ⅔ of the downstroke is timed to last one second, the total downstroke is then 1.5 seconds. A complete revolution thus takes 3 seconds, and in this embodiment, the RICE operates at 20 RPM.

In addition to volatile gases, a certain amount of carbon solids are formed when the powdered plastic vaporizes in the cylinder. These solids fall to the floor of the cylinder and are pushed by the piston 12 into a trough 26 as the piston completes the upstroke. The solids may fall into a container 27 by gravity feed, or they may be augured out of the trough with an auger (not shown) encased in the trough.

The hot volatile gases leave the cylinder 11 through the exhaust valve 18, and travel to the main condenser 25 where the temperature and pressure are regulated to cause oil and water condense and separate from the volatile compounds that remain in a gaseous state. Regulation may be accomplished by a heat exchanger that includes a first coil 28 mounted within a flue portion 29 of an enclosure 31, which carries away the exhaust gases from the natural gas burner 21. The heat exchanger also includes a second coil 32, which encircles the main condenser column 25. Pipes 33 connect the two coils, and a regulator pump 34 circulates a heat exchange fluid (such as oil) through the coils to transfer heat from the flue 29 to the main condenser 25 as needed.

Within the main condenser, oil condenses when the gases cool to about 350° C. The condensed oil flows downwardly through a trap to a reservoir 35. Some water may accompany the oil, and the oil and water naturally separate in the reservoir due to their different weights. A first pump 36 and tubes remove the oil to a storage tank 37. A second pump 38 and tubes remove the water to a storage tank 39.

The relatively hot volatile gases that do not condense in the main condenser move upwardly through an upper portion 41 of the main condenser column and are fed to a series of secondary condenser columns 42, 43, and 44. The gases gradually decrease in temperature and increase in pressure as they move through the secondary columns, and the pressure and temperature determine the nature of the condensate drawn off in each condenser stage. In this specific example, the gases are at about atmospheric pressure and 150° C. entering the first secondary stage 42. As a result, Diesel fuel is produced and drawn off to a tank 45. A condenser pump 46 connects the two stages 42 and 43, and gases enter stage 43 at about atmospheric pressure and 100° C. As a result, kerosene and/or toluene is drawn off and fed to a tank 47. Another condenser pump 48 connects the stages 43 and 44, and the gases enter stage 44 at about atmospheric pressure and 50° C. As a result, gasoline is drawn off to a tank 49.

Any remaining gas is fed to the storage tank 22 from the last condenser stage 44. A tube or pipe 52 is connected to extract gas from the tank 73 and provide it to the burner 21. Storage tank 22 may be configured as an expansion tank for relieving excess pressure that may build up in the condenser stages.

The pressure in the cylinder 11, and the rate at which hot volatile gases are provided to the main condenser 25 determines the type of liquid-gas products produced in the main and secondary condenser columns. For example, a low pressure (about 0 psi relative) produces light oils rich in aromatic hydrocarbons; higher pressures (about 200 psi relative) produces heavier oils richer in asphaltenes. The rate at which the gas travels up the main condenser column 41 is determined by the pressure in the cylinder 11, which can be adjusted by the operator by adjusting the speed of the electric motor 15. The pressures in the secondary condenser stages 42-44 may be controlled by the operator using the condenser pumps 46 and 48. Higher pressure results in lower temperature required to liquefy the volatile gas components, thus requiring less energy for cooling needed in the liquification process.

In another embodiment of the RICE, multiple cylinders operate to provide hot volatile gases to the main condenser 25. The cylinders may be arranged linearly, with each piston being connected to the crankshaft 14. Alternatively, the cylinders may be arranged radially around the main condenser.

Figure 2:
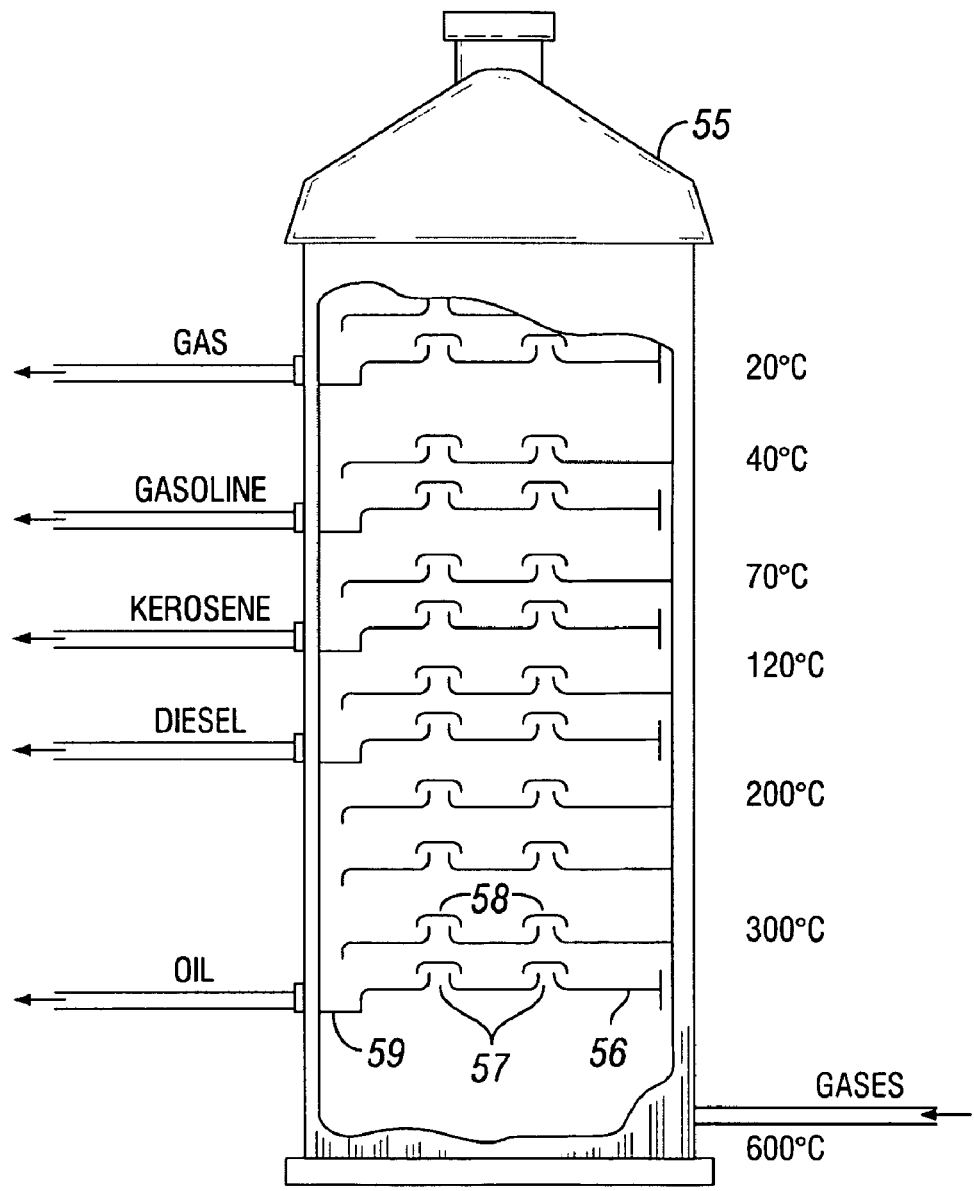
FIG. 2 is a partial cutaway view of an exemplary fractional distillation column suitable for use in an embodiment of the RICE.

FIG. 2 is a partial cutaway view of an exemplary fractional distillation column 55 suitable for use in an alternative embodiment of the RICE 10. The fractional distillation column is utilized in place of the main condenser 25 and secondary condenser stages 42-44. The hot gases from the cylinder 11 enter the bottom of the fractional distillation column at approximately 600° C. and rise through the column. The column includes a plurality of approximately horizontal plates 56 spaced apart throughout the height of the column. Each plate has a plurality of holes 57 that are loosely covered by rocking bubble caps 58 that allow the hot gases to pass through. The plates increase the contact time between the hot gases and the liquids that form in the column.

As the gases rise through the plates 56 in the column 55, the gases cool, creating a temperature difference across the column (hot at the bottom, cool at the top). When a substance in the gas reaches a height where the temperature of the column is equal to that substance's boiling point, it condenses to form a liquid. The substance with the lowest boiling point condenses at the highest point in the column; substances with higher boiling points condense lower in the column. The plates 56 collect liquids that form at various heights in the column. Thus, the lower plates collect oil, and higher plates collect Diesel fuel, kerosene, gasoline, and gas.

The plates may be flat but sloped toward the exit side of the column so that the condensed liquids flow into a collection tray 59. Each collection tray slopes toward an exit tube 60 that removes the collected liquid substances from the column. Alternatively, the plates may be raised slightly in the center, causing the liquid to flow into an annular collection tray around the circumference of the column. The annular tray slopes toward the exit tubes so that the collected liquids substances exit the column. After exiting the column, the collected liquid substances may be passed through condensers (not shown), which cool them further, before being placed into storage tanks.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. An apparatus for converting powdered plastic to usable fossil fuel, said apparatus comprising:
   a hollow cylinder containing an inert gas, said cylinder having a piston slidably mounted therein;
   means for externally heating the cylinder to raise an internal temperature to a predefined internal temperature;
   a compressed gas injector for injecting the powdered plastic into the heated cylinder as individual particles, wherein a size of the particles is sufficiently small and the predefined internal temperature is sufficiently high to vaporize the powered plastic and form a volatile gas without the particles falling onto an internal surface of the cylinder;
   means for sliding the piston to expel the volatile gas from the cylinder; and
   a condenser connected to the cylinder for receiving the volatile gas and condensing the volatile gas into the usable fossil fuel.

2. The apparatus as claimed in claim 1, wherein the means for externally heating the cylinder includes a gas burner.

3. The apparatus as claimed in claim 1, wherein the means for externally heating the cylinder includes resistive electric coils surrounding the cylinder.

4. The apparatus as claimed in claim 1, wherein the means for externally heating the cylinder heats the cylinder to produce an internal temperature in the cylinder in the range of 350 to 1,000 degrees Celsius.

5. The apparatus as claimed in claim 4, wherein the injector injects the powdered plastic into the cylinder utilizing the inert gas.

6. The apparatus as claimed in claim 5, wherein the inert gas is selected from a group consisting of nitrogen and argon.

7. The apparatus as claimed in claim 1, wherein the means for sliding the piston includes:
   a crankshaft;
   a piston rod connecting the piston to the crankshaft; and
   means for rotating the crankshaft.

8. The apparatus as claimed in claim 7, wherein the means for rotating the crankshaft includes an electric motor.

9. The apparatus as claimed in claim 1, wherein the condenser includes means for regulating a temperature and pressure within the condenser to cause the volatile gas to condense into the fossil fuel.

10. The apparatus as claimed in claim 1, wherein waste solids are formed in the cylinder when the powdered plastic vaporizes, and the apparatus further comprising means for expelling the waste solids from the cylinder.

11. The apparatus as claimed in claim 1, wherein the volatile gas condenses into both fossil fuel and water, and the apparatus further comprises means for separating the fossil fuel from the water.

12. The apparatus as claimed in claim 1, wherein the condenser includes a primary stage and a secondary stage, wherein the primary stage condenses the volatile gas into oil, and the secondary stage condenses the volatile gas into a fossil fuel selected from the group consisting of Diesel fuel, kerosene, toluene, gasoline, and natural gas.

13. The apparatus as claimed in claim 1, wherein the condenser is a fractional distillation column.

14. An apparatus for converting powdered plastic to usable fossil fuel, said apparatus comprising:
   a hollow cylinder containing an inert gas, said cylinder having a piston slidably mounted therein;
   a gas burner for externally heating the cylinder to raise an internal temperature to a predefined internal temperature;
   an injector for injecting the powdered plastic as individual particles into the heated cylinder utilizing an inert gas, wherein a size of the particles is sufficiently small and the predefined internal temperature is sufficiently high to vaporize the powered plastic and form a volatile gas without the particles falling onto an internal surface of the cylinder;
   means for sliding the piston to expel the volatile gas from the cylinder, said sliding means comprising:

a crankshaft;

a piston rod connecting the piston to the crankshaft; and an electric motor for rotating the crankshaft; and a condenser connected to the cylinder for receiving the volatile gas and condensing the gas into the usable fossil fuel.

15. The apparatus as claimed in claim 14, wherein the condenser includes a primary stage and a secondary stage, wherein the primary stage condenses the volatile gas into oil, and the secondary stage condenses the volatile gas into a fossil fuel selected from the group consisting of Diesel fuel, kerosene, toluene, gasoline, and natural gas.

16. The apparatus as claimed in claim 14, wherein the condenser is a fractional distillation column.

17. The apparatus as claimed in claim 14, wherein waste solids are formed in the cylinder when the powdered plastic vaporizes, and the apparatus further comprising means for expelling the waste solids from the cylinder.

18. An apparatus for converting powdered rubber to usable fossil fuel, said apparatus comprising:

a hollow cylinder containing an inert gas, said cylinder having a piston slidably mounted therein;

means for externally heating the cylinder to raise an internal temperature to a predefined internal temperature;

a compressed gas injector for injecting the powdered rubber into the, heated cylinder as individual particles, wherein a size of the particles is sufficiently small and the predefined internal temperature is sufficiently high to vaporize the powered rubber and form a volatile gas without the particles falling onto an internal surface of the cylinder;

means for sliding the piston to expel the volatile gas from the cylinder; and a condenser connected to the cylinder for receiving the volatile gas and condensing the volatile gas into the usable fossil fuel.

* * * * *